US 6,650,732 B2

(12) United States Patent
Benedict et al.

(10) Patent No.: US 6,650,732 B2
(45) Date of Patent: Nov. 18, 2003

(54) TELEPHONY TESTING SYSTEM

(75) Inventors: John M. Benedict, Cheswick, PA (US); Bradford R. Holmes, Allison Park, PA (US); Larry Mortimer, Woodstock, GA (US)

(73) Assignee: Tollgrade Communications, Inc., Wilmington, DE (US)

( * ) Notice: Subject to any disclaimer, the term of this patent is extended or adjusted under 35 U.S.C. 154(b) by 0 days.

(21) Appl. No.: 10/109,439

(22) Filed: Mar. 28, 2002

(65) Prior Publication Data

US 2002/0110222 A1 Aug. 15, 2002

Related U.S. Application Data

(62) Division of application No. 09/508,622, filed as application No. PCT/US98/19622 on Sep. 18, 1998.
(60) Provisional application No. 60/059,394, filed on Sep. 19, 1997.

(51) Int. Cl.[7] .................................................. H04M 1/24
(52) U.S. Cl. ..................................................... 379/27.01
(58) Field of Search ......................... 379/101, 9, 26.01, 379/27.01, 14.01, 10.01, 12, 22, 22.02, 22.03, 22.04, 22.08, 24, 27.03, 29.01, 29.05, 29.11, 30

(56) References Cited

U.S. PATENT DOCUMENTS

| 3,892,928 | A | | 7/1975 | Casterline et al. ..... 179/175.2 R |
|---|---|---|---|---|
| 4,629,836 | A | | 12/1986 | Walsworth .................... 379/12 |
| 4,774,721 | A | * | 9/1988 | Gift et al. ...................... 379/10 |
| 5,111,497 | A | | 5/1992 | Bliven et al. .................. 379/27 |
| 5,361,293 | A | | 11/1994 | Czerwiec ...................... 379/27 |
| 5,471,517 | A | | 11/1995 | Nakagawa ................... 379/29 |
| 5,615,225 | A | | 3/1997 | Foster et al. .................. 379/29 |

* cited by examiner

Primary Examiner—Rexford Barnie
(74) Attorney, Agent, or Firm—Webb Ziesenheim Logsdon Orkin & Hanson, P.C.

(57) ABSTRACT

An electronic relay matrix (22) is connectable between a plurality of customer telephone lines and a plurality of testers (2, 20$_{1-203}$) The electronic relay matrix (22) includes a line matrix (80) having a plurality of relay assemblies (82$_1$–82$_{50}$) Each relay assembly (82) in a relaxed state connects together the line-side (12) and the drop-side (8) of one of the customer telephone lines. Each relay assembly (82) is adjustable to enable one of the plurality of testers (2, 20$_1$–20$_3$) to be connected to the drop-side (8) and/or the line-side (12) of a desired customer telephone line.

4 Claims, 6 Drawing Sheets

TELEPHONY TESTING SYSTEM

CROSS-REFERENCE TO RELATED APPLICATIONS

This application is a divisional of U.S. patent application Ser. No. 09/508,622, filed Jun. 5, 2000, which was the national phase of International Application No. PCT/US98/19622, filed Sept. 18, 1998, which claimed priority to U.S. Provisional Application No. 60/059,394, filed Sep. 19, 1997.

BACKGROUND OF THE INVENTION

1. Field of the Invention

This invention relates to an electronic relay matrix utilized to selectively connect together a telephone line tester and a customer telephone line.

2. Description of the Prior Art

Until recently, telephone companies (TCs) have enjoyed a monopoly in local exchange carrier markets. Accordingly, in the event of trouble with their telephone service, a customer would notify their TC of the trouble and the TC would initiate an automated test of the telephone and equipment of the customer experiencing the trouble. More specifically, as shown in FIG. 1, a TC tester 2 provides test and control signals to a TC switch 4. The control signals cause the TC switch 4 to selectively connect telephony equipment of a customer, e.g., $6_1$, to the TC tester 2 through a drop-side $8_1$, of a telephone line, a main distribution frame (MDF) 10, a line-side $12_1$, of the telephone line, and the TC switch 4. Similarly, a customer $6_2$ can be connected to the TC tester 2 through a drop-side $8_2$, the MDF 10, a line-side $12_2$ and the TC switch 4.

The Telecommunications (TELCO) Act of 1996 requires TCs to lease customer telephone lines, and specifically the drop-sides 8 of customer telephone lines, to rival telephone companies (RTCS). Hence, the TELCO Act breaks up the monopoly enjoyed by the TCs in the local exchange carrier market.

With reference to FIG. 2, to enable an RTC to service the telephony equipment of the customer $6_2$, the line-side $12_2$ servicing the telephony equipment of the customer $6_2$ is disconnected from the TC switch 4 and connected to an RTC switch 16 through an intermediate distribution frame (IDF) 18. Hence, the RTC switch 10 can service the telephony equipment of the customer $6_2$ that heretofore was serviced by the TC switch 4.

In the embodiment shown in FIG. 2, the TC switch 4 and the RTC switch 16 are connected to their respective customers $6_1$ and $6_2$ through the main distribution frame 10. Since the TC switch 4 services only TC customers, i.e., $6_1$, the TC tester 2 is not available to test the line-side $12_2$, the drop-side $8_2$ and the telephony equipment of the RTC customers $6_2$. To test the line-side $12_2$, the drop-side $8_2$ and the telephony equipment of the RTC customer $6_2$, the RTC must provide an RTC tester 20 connected to the RTC switch 16.

If the RTC customer $6_2$ reports a problem with their telephone service, the RTC initiates testing of the drop-side $8_2$, the line-side $12_2$ and the telephony equipment of the RTC customer $6_2$ with the RTC tester 20. If no problem is found, an assumption is made that the leased TC equipment, i.e., the drop-side $8_2$, the line-side $12_2$ or the MDF 10, is causing the customer problem and the RTC notifies the TC. Since the line-side $12_2$ of the RTC customer $6_2$ no longer runs through the TC switch 4, the TC tester 2 is not able to access the line-side $12_2$ for automated testing. Hence, a craftsperson must be dispatched to run manual tests of the line-side $12_2$, the drop-side $8_2$ and the telephony equipment of the RTC customer $6_2$. If trouble is found, the fault must be located and repaired.

The inability of the TC to automatically test the line-side $12_2$, the drop-side $8_2$ and the telephony equipment of the RTC customer $6_2$ represents a potential for increased time to repair customer problems, increased use of human resources and increased costs due to the increased use of human resources. The potential for this increased cost is of sufficient concern that utility regulations require RTCs to pay TCs for false trouble reports and no-problem-found situations. However, the regulations also provide that TCs can only bill RTCs for false trouble reports or no-problem-found situations if the TC is capable of submitting a test printout to verify the results. However, since the TCs are unable to use the TC tester 2, automated test printouts are not readily available. The lack of automated test printouts impedes the ability of the TCs to invoice RTCs for false trouble reports and no-problem-found situations. With poor trouble handling procedures, the TCs and the RTCs may experience profit losses and possibly even customer losses.

It is therefore an object of the present invention to provide a point of access for testing non-switched customer lines and special service circuits using existing test equipment. It is an object of the present invention to provide an apparatus that enables TCs and RTCs to test telephone lines leased to RTCs utilizing a TC tester or an RTC tester. Still further objects of the present invention will become apparent to those of ordinary skill in the art upon reading and understanding the following detailed description.

SUMMARY OF THE INVENTION

Accordingly, we have invented a test system for testing a first plurality of telephone lines and a second plurality of telephone lines. The test system includes an electronic relay matrix (ERM) connectable between the line-side and the drop-side of each telephone line of the first plurality of telephone lines and connectable between the line-side and the drop-side of each telephone line of the second plurality of telephone lines. A first tester is connected to the ERM via the line-side of each of the first plurality of telephone lines and via a first test path. A second tester is connected to the ERM via the line-side of each of the second plurality of telephone lines and via a second test path. In response to a control signal on one of the first test path and the second test path, the ERM connects to one of the first test path and the second test path at least one of the line-side and the drop-side of a telephone line of one of the first plurality of telephone lines and the second plurality of telephone lines.

In the absence of the control signal, the ERM connects together the line-side and the drop-side of each telephone line of the first plurality of telephone lines and connects together the line-side and the drop-side of each telephone line of the second plurality of telephone lines.

A first switch can be connected between the first tester and the line-sides of the first plurality of telephone lines. The first switch is configured to connect the first tester to the line-side of one of the first plurality of telephone lines. A second switch can be connected between the second tester and the line-sides of the second plurality of telephone lines. The second switch is configured to connect the second tester to the line-sides of one of the second plurality of telephone lines.

A third switch can be connected between a third tester and the ERM. The third switch is connected to the ERM via line-sides of a third plurality of telephone lines. The third switch is configured to connect the third tester to at least one of the line-sides of the third plurality of telephone lines. An intermediate distribution frame can be connected between the second switch and the ERM and between the third switch and the ERM. The intermediate distribution frame can be utilized to connect each line-side of the second plurality of telephone lines and each line-side of the third plurality of telephone lines to the second tester and the third tester, respectively.

We have also invented an electronic relay matrix (ERM) which is connectable to a plurality of testers and a plurality of telephone lines. Each tester is connectable to the ERM through a test path and through the line-side of at least one of the plurality of telephone lines. The ERM includes a line matrix having a plurality of relay assemblies. Each relay assembly is configured to connect together the line-side and the drop-side of one of the plurality of telephone lines and to receive an address signal. A relay mechanism is connected between the line matrix and the test paths. A controller is configured to detect a control signal on one of the test paths and to cause the relay mechanism to connect the one test path to the plurality of relay assemblies. The controller causes an address signal to be generated whereby one of the relay assemblies adjusts and connects the one test path to at least one of a line-side and a drop-side of the telephone line connected to the one relay assembly.

The ERM can include a plurality of current detectors, a multi-frequency decoder, a TR reverse switch, a DC detect circuit and an AC detect circuit. Each current detector can be configured to detect the presence of the control signal on one of the test paths and to provide the controller with an indication thereof. The multi-frequency decoder can be configured to decode the control signal on the one of the test paths and to provide to the controller the decoded control signal. The TR reverse switch can be configured to reverse a polarity of a tip-ring pair which comprise the one test path. The DC detect circuit can be configured to detect a DC signal on one of the plurality of telephone lines and to provide to the controller an indication thereof. The AC detect circuit can be configured to detect an AC signal on one of the plurality of telephone lines and to provide the controller with an indication thereof.

Each test path can include a ring lead, a tip lead and a sleeve lead. The plurality of current detectors can include a first plurality of current detectors which are each configured to detect the control signal on one of the tip lead and the ring lead of one of the test paths and to provide to the controller an indication thereof. The plurality of current detectors can also include a second plurality of current detectors each configured to detect the control signal on the sleeve lead of one of the test paths and to provide to the controller an indication thereof.

The relay mechanism can include a first relay, a second relay and third relay. The first relay can be configured to connect the multi-frequency decoder to one of the test paths in response to one of the plurality of current detectors detecting the control signal on the one test path. The second relay can be configured to connect the DC detect circuit and/or the AC detect circuit to the plurality of relay assemblies in response to the controller receiving the decoded control signal. The third relay can be configured to connect the one test path to the plurality of relay assemblies in response to the DC detect circuit and/or the AC detect circuit detecting an absence of a DC signal and/or an AC signal on the telephone line connected to the at least one relay assembly.

An address decoder can be connected between the controller and the line matrix. The address decoder can be configured to receive from the controller a signal that causes the address decoder to supply the address signal to the one of the relay assemblies.

We have also invented a method of testing a plurality of telephone lines. The method includes detecting an absence of subscriber activity on one of a plurality of telephone lines having its line-side connectable to one tester. In response to detecting the absence of subscriber activity, a test path of the one tester or the test path of another tester is connected to the line-side and/or the drop-side of the one of the plurality of telephone lines.

Lastly, we have invented an apparatus for testing a telephone line. The apparatus includes a decoder which is connected to a controller and which is connectable to a test path. The decoder is configured to decode a control signal on the test path and to provide the decoded control signal to the controller. A line matrix is connected to the controller and is connectable to a plurality of telephone lines each having a line-side and a drop-side.

A telephone line detector is connected to the controller and is connectable to the plurality of telephone lines. A relay mechanism is connected to the controller, the line matrix, the telephone line detector and the test path of the first tester. In response to receiving the decoded control signal, the controller causes the line matrix to select one of the plurality of telephone lines and causes the relay mechanism to connect the telephone line detector to the selected one of the plurality of telephone lines. In response to the telephone line detector detecting an absence of activity on the selected one of the plurality of telephone lines, the controller causes the relay mechanism to connect the test path to at least one of the line-side and the drop-side of the selective one of the plurality of telephone lines.

DESCRIPTION OF THE PREFERRED EMBODIMENT

Figure 1:
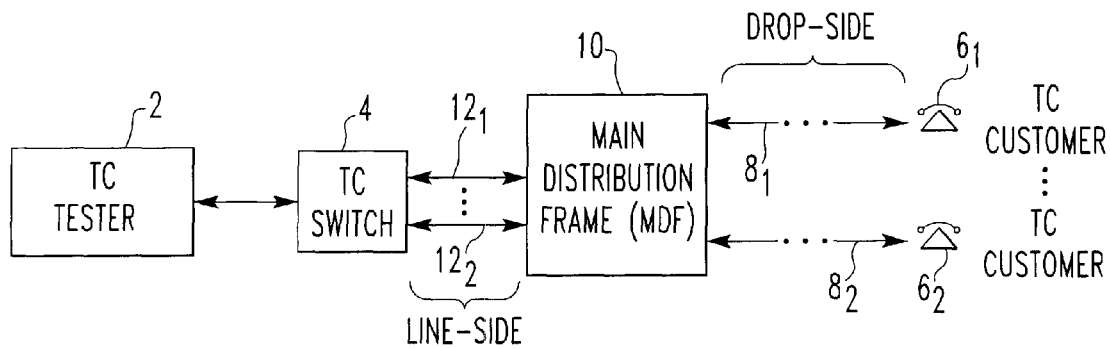
FIG. 1 is a block diagram of a prior art connection of a telephone company (TC) tester to a TC switch which services plural customer lines.
Figure 2:
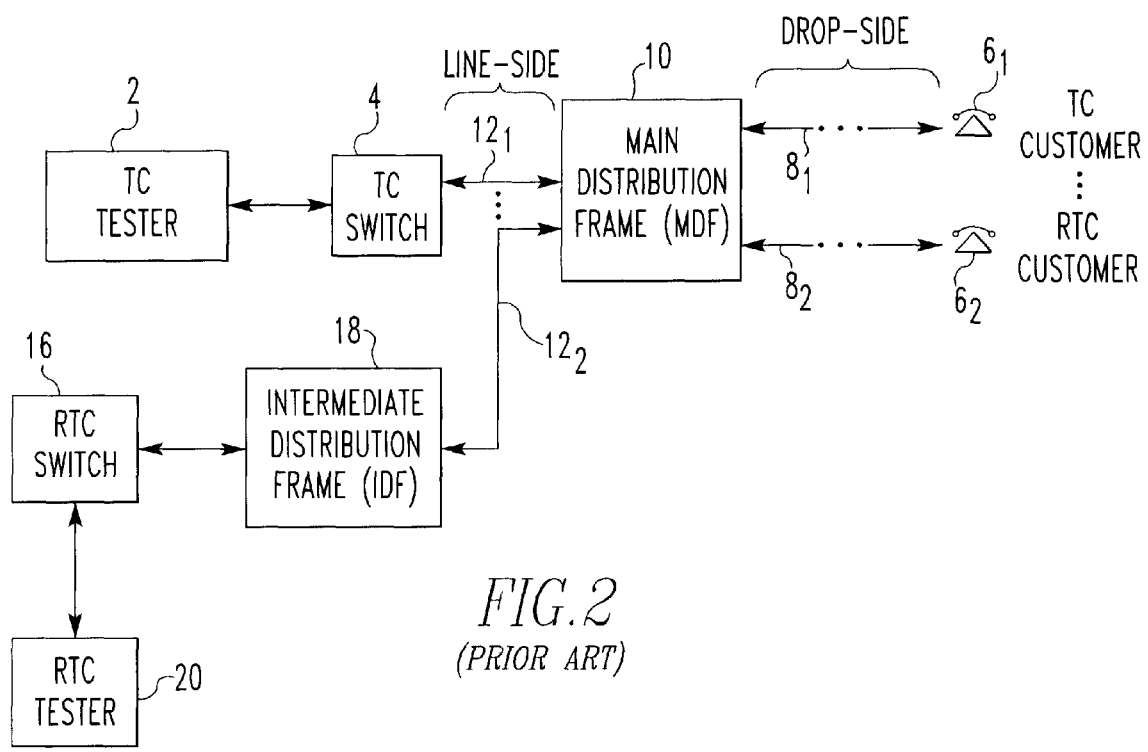
FIG. 2 is a block diagram of a prior art TC tester connected to a TC switch which services a TC customer through a main distribution frame and a rival telephone company (RTC) tester connected to an RTC switch which services an RTC customer through the main distribution frame.
Figure 3:
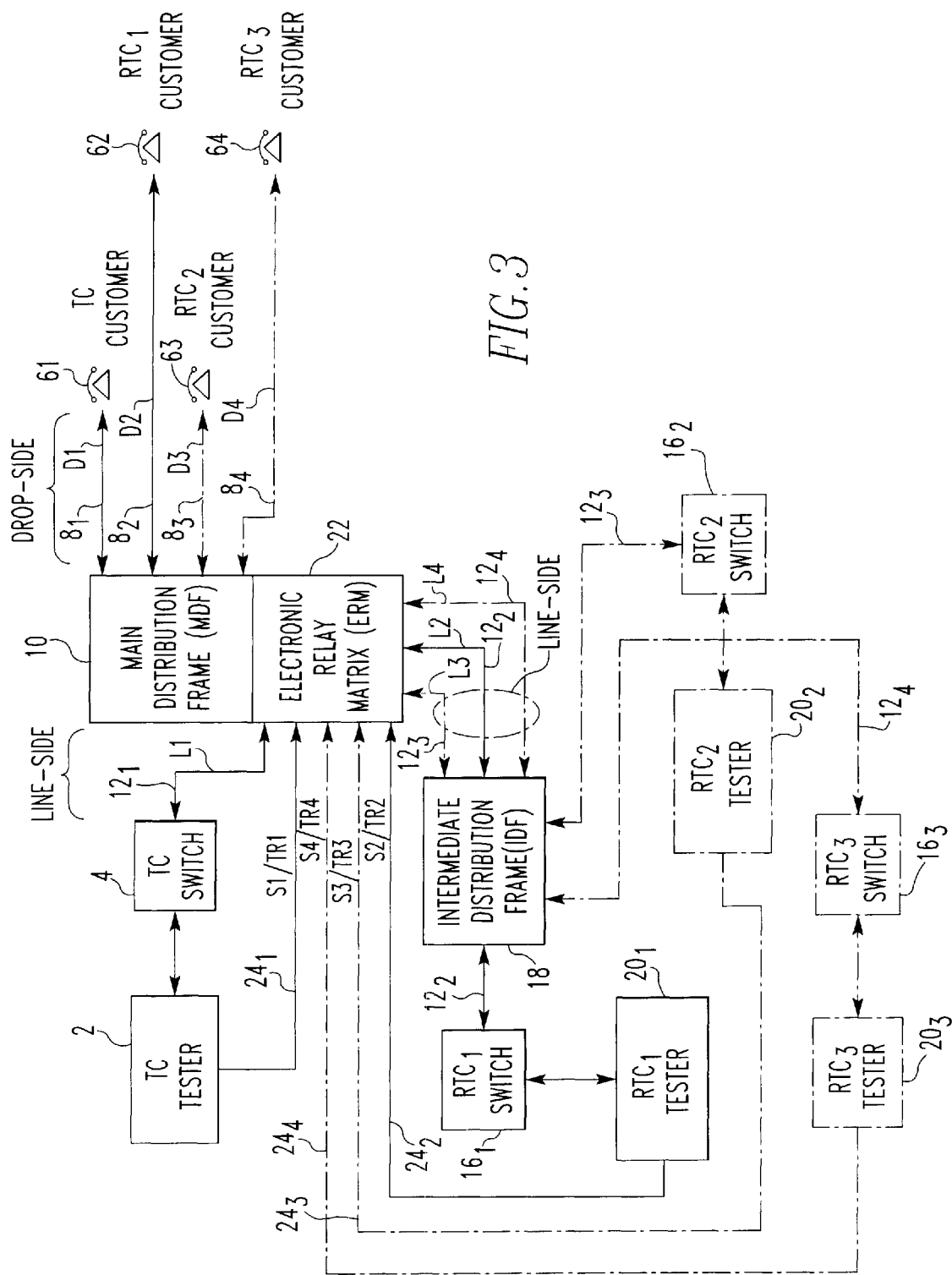
FIG. 3 is a block diagram of a TC/RTC switching and testing network connected to a main distribution frame through an electronic relay matrix in accordance with the present invention.

With reference to FIG. 3, a telephone company (TC) tester 2 is connected to a TC customer 61 through a TC switch 4, a line-side $12_1$, of a telephone line, an electronic relay matrix (ERM) 22, a main distribution frame (MDF) 10 and a drop-side $8_1$ of the telephone line. Connected between the TC tester 2 and the ERM 22 is a line $24_1$, which includes a sleeve S1 and a tip-ring pair TR1. The sleeve S1 and the tip-ring pair TR1 are utilized to pass test and control signals between the TC tester 2 and the ERM 22.

A first rival telephone company ($RTC_1$,) tester $20_1$ is connected to an $RTC_1$ customer $6_2$ through an $RTC_1$ switch $16_1$, an intermediate distribution frame (IDF) 18, a line-side $12_2$ of a telephone line, the ERM 22, the MDF 10 and a drop-side $8_2$ of the telephone line. The $RTC_1$ tester $20_1$ is also connected to the ERM 22 by a line $24_2$ which includes a sleeve S2 and a tip-ring pair TR2. A second rival telephone company $RTC_2$ tester $20_2$, shown in phantom in FIG. 3, can be connected to an $RTC_2$ customer $6_3$ through an $RTC_2$ switch $16_2$, the IDF 18, a line-side $12_3$ of a telephone line, the ERM 22, the MDF 10 and a drop-side $8_3$ of the telephone line. Similarly, a third rival telephone company $RTC_3$ tester $20_3$, shown in phantom in FIG. 3, can be connected to an $RTC_3$ customer $6_4$ through an $RTC_3$ switch $16_3$, the IDF 18, a line-side $12_4$ of a telephone line, the ERM 22, the MDF 10 and the drop-side $8_4$ of the telephone line. The $RTC_2$ tester $20_2$ and the $RTC_3$ tester $20_3$ are also connected to the ERM 22 by lines $24_3$ and $24_4$ which include sleeves S3 and S4 and tip-ring pairs TR3 and TR4, respectively. The sleeves S2–S4 and the tip-ring pairs TR2–TR4 of lines $24_2$–$24_4$ are utilized to pass test and control signals between the ERM 22 and the RTC testers $20_1$–$20_3$, respectively.

The line-side $12_1$, and the line $24_1$ define a first test path and a second test path, respectively, between the TC tester 2 and the ERM 22. The first test path is utilized to convey test signals between the TC tester 2 and the TC customer $6_1$ via the line-side $12_1$ and the drop-side $8_1$ of the telephone line of the TC customer $6_1$. The second test path is utilized to convey test and control signals between the TC tester 2 and the ERM 22. The control signals conveyed via the line $24_1$, cause the ERM 22 to selectively connect to the line $24_1$ one of the drop-sides $8_1$–$8_4$ connected to the MDF 10 and/or one of the line-sides $12_1$–$12_4$ connected to the ERM 22. When the line $24_1$ is connected to one of the line sides $12_1$–$12_4$ and/or one of the drop-sides $8_1$–$8_4$, the TC tester 2 can supply test signals thereto.

Similarly, the line-sides $12_2$–$12_4$ and the lines $24_2$–$24_4$ define first and second test paths, respectively, between the RTC testers $20_1$–$20_3$ and the RTC customers $6_2$–$6_4$. The first test path is utilized to convey test signals between the RTC testers $20_1$–$20_3$ and the RTC customers $6_2$–$6_4$ via the line-sides $12_2$–$12_4$ and the drop-sides $8_2$–$8_4$, respectively. The second test paths are utilized to convey test and control signals between each RTC tester $20_1$–$20_3$ and the ERM 22. The control signals conveyed via one of the lines $24_2$–$24_4$ cause the ERM 22 to selectively connect to the one of the lines $24_2$–$24_4$, one of the drop-sides $8_1$–$8_4$ connected to the MDF 10 and/or one of the line-sides $12_1$–$12_4$ connected to the ERM 22. When one of the lines $24_2$–$24_4$ is connected to the one of the line-sides $12_1$–$12_4$ and/or the one of the drop-sides $8_1$–$8_4$, the RTC tester $20_1$–$12_3$ connected to the one of the lines $24_2$–$24_4$ can supply test signals thereto. When connected to a line-side and a drop-side, one of the lines $24_1$–$24_4$ is preferably connected to the line-side and the drop-side of the telephone line connected to one customer. However, one of the lines $24_1$–$24_4$ can be cross-connected to the line-side of the telephone line connected to one customer and the drop-side of the telephone line connected to another customer.

Figure 4A:
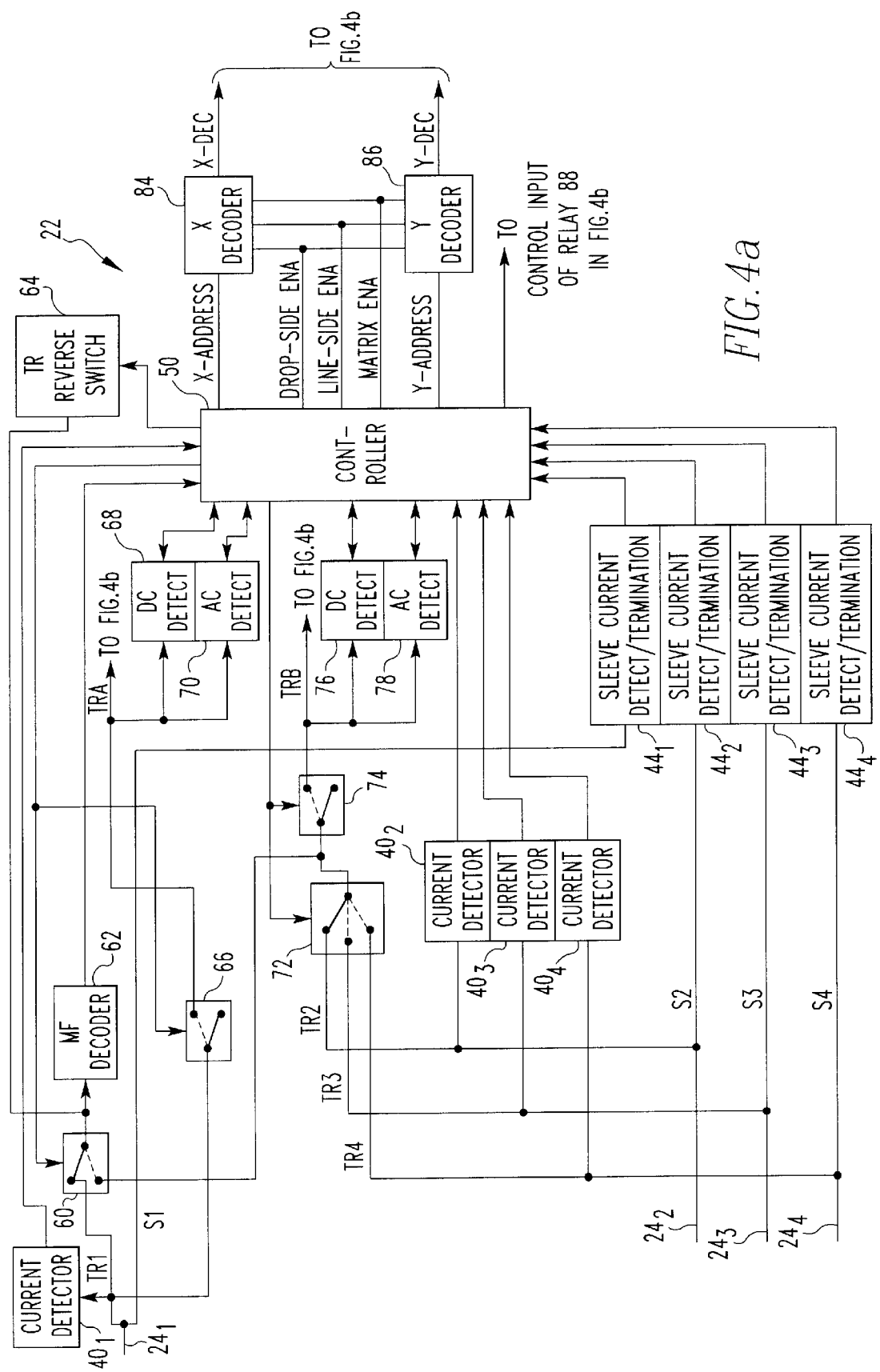
FIGS. 4a–4b are block diagrams of internal circuitry of the electronic relay matrix of FIG. 3 including a plurality of relay assemblies.
Figure 4B:
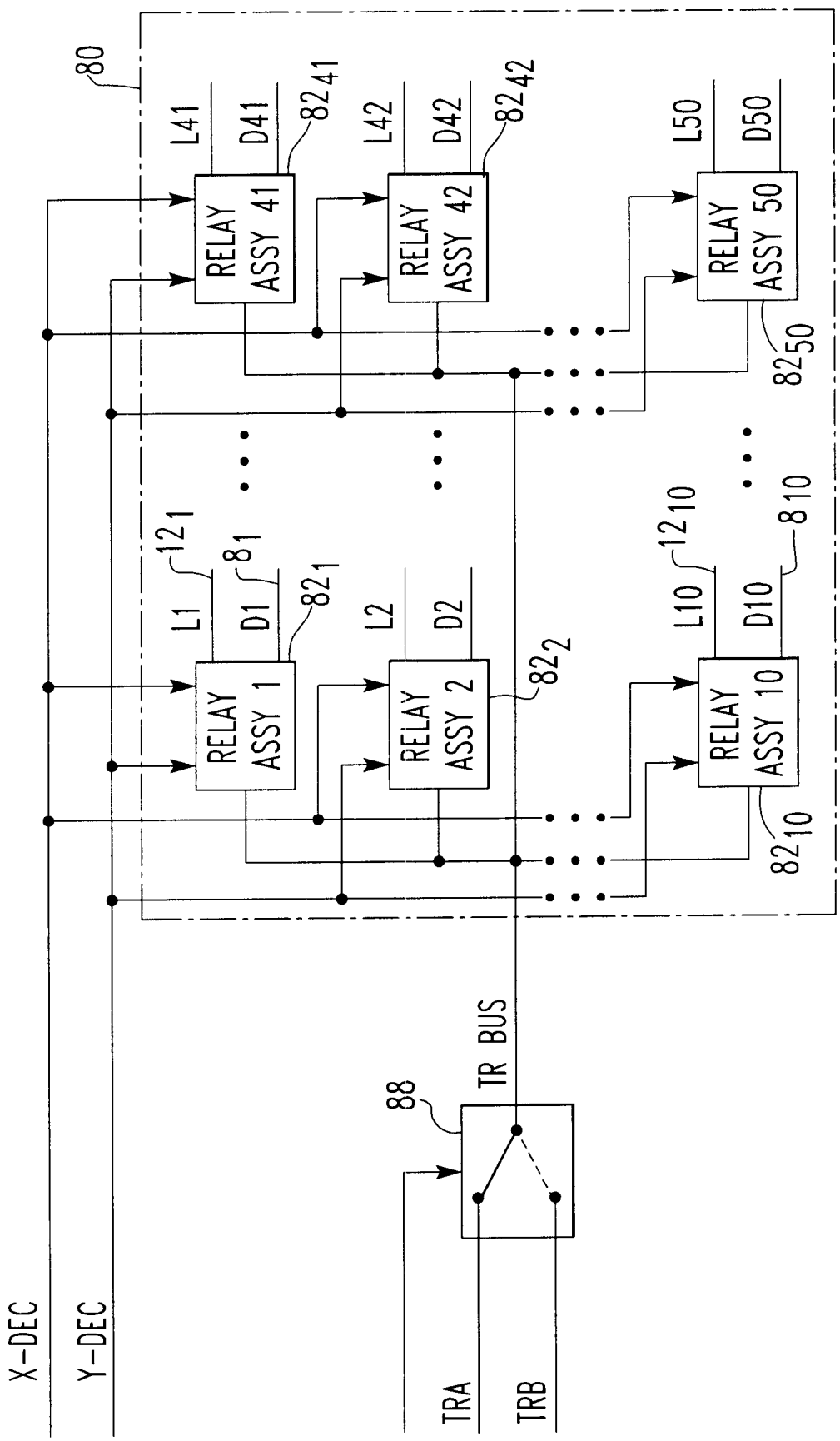

With reference to FIGS. 4a–4b, and with ongoing reference to FIG. 3, the ERM 22 includes current detectors $40_1$–$40_4$ connected to detect current flowing in the tip leads or the ring leads of the tip-ring pairs TR1–TR4 of lines $24_1$–$24_4$, respectively. A controller 50 is connected to receive from each of the current detectors $40_1$–$40_4$ an output indicative of a current detected thereby. Sleeve current detect/terminations $44_1$–$44_4$ are connected to detect current flowing in the sleeves S1–S4 of lines $24_1$–$24_4$, respectively. The controller 50 is connected to receive from each of the sleeve current detect/terminations $44_1$–$44_4$ an output indicative of the current detected thereby.

A relay 60 is connected between the tip-ring pair TR1 of line $24_1$ and a multi-frequency (MF) decoder 62. The controller 50 is connected to an output of the MF decoder 62. A TR reverse switch 64 is connected between the relay 60 and a control output of the controller 50. A relay 66 is connected between the tip-ring pair TR1 and a tip-ring pair TRA. The tip-ring pair TRA are connected to inputs of a DC detect circuit 68 and an AC detect circuit 70. The DC detect circuit 68 and the AC detect circuit 70 have outputs connected to inputs of the controller 50. A relay 72 is connected between tip-ring pairs TR2–TR4 of lines $24_2$–$24_4$ and an isolation relay 74. The isolation relay 74 is connected between the relay 72 and a tip-ring pair TRB. The tip-ring pair TRE are connected to inputs of a DC detect circuit 76 and an AC detect circuit 78. The DC detect circuit 76 and the AC detect circuit 78 have outputs connected to inputs of the controller 50. A node between the relay 72 and the isolation relay 74 is connected to the relay 60. Each of the relays 60, 66, 72 and 74 have control inputs connected to relay control outputs of the controller 50. The DC detect circuits 68 and 76 and the AC detect circuits 70 and 78 each include internal relays (not shown) which, under the control of the controller 50, can selectively connect the DC detect circuits 68 and 76 and the AC detect circuits 70 and 78 to the tip-ring pair TRA and the tip-ring pair TRB, respectively.

The ERM 22 includes a line matrix 80, shown in FIG. 4b, which has a plurality of relay assemblies $82_1$–$82_{50}$. Each relay assembly $82_1$–$82_{50}$ includes a plurality of relays each having a plurality of contacts. The relay assemblies $82_1$–$82_{50}$ will be described in greater detail hereinafter.

An X-decoder 84 and a Y-decoder 86 each have one or more inputs connected to receive address signals from the controller 50. The address signals received by the X-decoder include a drop-side enable signal, a line-side enable signal, a matrix enable signal and X-address signals. In response to receiving the address signals, the X-decoder 84 supplies to the line matrix 80 an X-DEC signal. Similarly, the address signals received by the Y-decoder 86 include the drop-side enable signal, the line-side enable signal, the matrix enable signal and Y-address signals. In response to receiving the address signals, the Y-decoder 86 supplies to the line matrix 80 a Y-DEC signal. The X-DEC signal and the Y-DEC signal received at the line matrix 80 coact to select one of the relay assemblies $82_1$–$82_{50}$ and to cause the selected one of the relay assemblies $82_1$–$82_{50}$ to adjust and connect the line-side 12 and/or the drop-side 8 of the telephone line connected thereto to a tip-ring pair TR Bus.

The tip-ring pair TR Bus are connected to inputs of each of the relay assemblies $82_1$–$82_{50}$ of the line matrix 80. A relay 88 is connected between the tip-ring pair TRA and the tip-ring pair TR Bus. The relay 88 is also connected between the tip-ring pair TRB and the tip-ring pair TR Bus. The relay 88 has a control input connected to a relay control output of the controller 50. In response to a signal at its control input, the relay 88 selectively connects the tip-ring pair TRA or the tip-ring pair TRB to the tip-ring pair TR Bus. The relays 60, 66, 72, 74 and 88 form a relay mechanism which can selectively connect one of the tip-ring pairs TR1–TR4 of lines $24_1$–$24_4$ to the relay assemblies $82_1$–$82_{50}$ of the line matrix 80 via the tip-ring pair TR Bus.

In operation, contacts of the relay assemblies $82_1$–$82_{50}$ are adjusted in response to the TC tester 2 or one of the RTC testers $20_1$–$20_3$ conveying a control signal on the tip lead of one of the tip-ring pairs TR1–TR4 of lines $24_1$–$24_4$, respectively. In response to the control signal, the controller 50 causes the contacts of one of the relay assemblies $82_1$–$82_{50}$ to adjust and connect the line-side 12 or the drop-side 8 of the telephone line connected to the one of the relay assemblies $82_1$–$82_{50}$ to the tip-ring pair of the line utilized to convey the control signal. This connection enables the TC tester 2 or one of the RTC testers $20_1$–$12_3$ to convey test signals to the line-side 12 or the drop-side 8 of the telephone line connected to the one of the relay assemblies $82_1$–$82_{50}$ through the tip-ring pair of the line utilized to convey the control signal. Alternatively, in response to the control signal, the controller 50 causes the contacts of one of the relay assemblies $82_1$–$82_{50}$ to adjust and bridge connect the tip-ring pair of the line utilized to convey the control signal to the telephone line connected to the one of the relay assemblies $82_1$–$82_{50}$. This bridge connection enables the DC detect circuits 68 or 72 and/or the AC detect circuits 70 or 78 to detect the presence or absence of activity on the telephone line connected to the one of the relay assemblies $82_1$–$82_{50}$. In the absence of a control signal being conveyed on one of the tip-ring pairs TR1–TR4 of the lines $24_1$–$24_4$, the contacts of each relay assembly $82_1$–$82_{50}$ are in a relaxed, normally closed state which forms a pass-through connection between the line-side 12 and the drop-side 8 of the telephone line connected thereto.

More specifically, if the TC tester 2 is utilized to test a selected telephone line, the TC tester 2 supplies to the ERM 22 a control signal on the tip lead of the tip-ring pair TR1 of the line $24_1$. The control signal on the tip-ring pair TRI of the line $24_1$ is detected by the current detector $40_1$. In response to detecting the control signal, the current detector $40_1$ supplies to the controller 50 a signal indicative thereof. In response to the signal from the current detector $40_1$, the controller 50 causes the relay 60 to-adjust and connect the tip-ring pair TR1 of the line $24_1$ to the MF decoder 62 and the TR reverse switch 64. The controller 50 causes the TR reverse switch 64 to reverse the polarity of the tip-ring pair TRI of the line $24_1$. In response to detecting the reversed polarity of the tip-ring pair TR1 of the line $24_1$, the TC tester 2 supplies control signals to the tip-ring pair TR1 of the line $24_1$. The MF decoder 62 converts the control signals supplied on the tip-ring pair TR1 of the line $24_1$ into digital signals usable by the controller 50. The digital signals from the MF decoder 62 are processed by the controller 50 into the address signals that are provided to the X-decoder 84 and the Y-decoder 86. The address signals cause the X-decoder 84 and the Y-decoder 86 to supply to the line matrix 80 the X-DEC signal and the Y-DEC signal. The digital signals from the MF decoder 62 also cause the controller 50 to adjust the relay 88 to connect the tip-ring pair TRA to the tip-ring pair TR Bus and cause the controller 50 to connect the DC detect circuit 68 and the AC detect circuit 70 to the tip-ring pair TRA.

The X-DEC signal and the Y-DEC signal received by the line matrix 80 cause one of the relay assemblies $82_1$–$82_{50}$ to adjust and connect the tip-ring pair TR Bus to (i) a line-side 12 and a drop-side 8 of the selected telephone line in a bridge mode, (ii) the line-side 12 of the selected telephone line or (iii) the drop-side 8 of the selected telephone line. When connected in the bridge mode, the tip-ring pair TR Bus connects the line-side 12 and the drop-side 8 of the selected telephone line to the DC detect circuit 68 and the AC detect circuit 70 via the tip-ring pair TRA. The DC detect circuit 68 and the AC detect circuit 70 detect the presence or absence of a respective DC voltage or an AC voltage, indicative of activity on the selected telephone line, and provide to the controller 50 outputs indicative thereof. In the absence of the DC detect circuit 68 or the AC detect circuit 70 detecting the respective DC voltage or AC voltage on the selected telephone line, the controller 50 causes the DC detect circuit 68 and the AC detect circuit 70 to be isolated from the tip-ring pair TRA and causes the TR reverse switch 64 to re-reverse the polarity of the tip-ring pair TR1.

In response to detecting the re-reversal of the polarity of the tip-ring pair TRI, the TC tester 2 adapts itself to convey control signals to the ERM 22 on the sleeve S1 of the line $24_1$. The control signals on the sleeve S1 are detected by the sleeve current detect/termination $44_1$ which supplies to the controller 50 signals indicative thereof. In response to-the signals from the sleeve current detect/termination $44_1$, the controller 50 causes the relay 66 to adjust and connect the tip-ring pair TR1 of the line $24_1$ to the tip-ring pair TRA. Connecting the tip-ring pair TRI of line $24_1$ to the tip-ring pair TRA creates between the TC tester 2 and the selected telephone line a test path which includes the tip-ring pair TR1 of line $24_1$, the tip-ring pair TRA and the tip-ring pair TR Bus. Similarly, a control signal supplied to the ERM 22 by one of the RTC testers $20_1$–$12_3$ on the tip lead of one of tip-ring pairs TR2–TR4 of lines $24_2$–$24_4$ is detected by one of the current detectors $40_2$–$40_4$, respectively. In response to detecting the control signal, the one of the current detectors $40_2$–$40_4$ supplies to the controller 50 a signal indicative thereof. In response to the signal from the one of the current detectors $40_2$–$40_4$, the controller 50 causes the relays 60 and 72 to adjust and connect the one of the tip-ring pairs TR2–TR4 of the lines $24_2$–$24_4$ to the MF decoder 62 and the TR reverse switch 64. The controller 50 causes the TR reverse switch 64 to reverse the polarity of the one of the tip-ring pairs TR2–TR4 of the lines $24_2$–$24_4$. In response to detecting the reversed polarity, the one of the RTC testers $20_1$–$12_3$ supplies control signals on the one of the tip-ring pairs TR2–TR4 of the lines $24_2$–$24_4$. The MF decoder 62 converts the control signals into digital signals usable by the controller 50. The digital signals from the MF decoder 62 are processed by the controller 50 into the address signals that are provided to the X-decoder 84 and the Y-decoder 86. The address signals cause the X-decoder 84 and the Y-decoder 86 to supply to the line matrix 80 the X-DEC signal and the Y-DEC signal. The digital signals from the MF decoder 62 also cause the controller 50 to adjust the relay 88 to connect the tip-ring pair TRB to the tip-ring pair TR Bus and cause the controller 50 to connect the DC detect circuit 76 and the AC detect circuit 78 to the tip-ring pair TRB.

The X-DEC signal and the Y-DEC signal received by the line matrix 80 cause one of the relay assemblies $80_1$–$80_{50}$ to adjust and connect the tip-ring pair TR Bus to (i) a line-side 12 and a drop-side 8 of a selected telephone line in a bridge mode, (ii) the line-side 12 of the selected telephone line or (iii) the drop-side 8 of the selected telephone line. When connected in the bridge mode, the tip-ring pair TR Bus connects the line-side 12 and drop-side 8 of the selected customer telephone line to the DC detect circuit 76 and the AC detect circuit 78 via the tip-ring pair TRB. The DC detect circuit 76 and the AC detect circuit 78 detect the presence or absence of a respective DC voltage or an AC voltage, indicative of activity on the selected customer telephone line, and provide to the controller 50 outputs indicative thereof. In the absence of the DC detect circuit 76 or the AC detect circuit 78 detecting the respective DC voltage or AC voltage on the selected customer telephone line, the controller 50 causes the DC detect circuit 76 and the AC detect circuit 78 to be isolated from the tip-ring pair TRB and causes the TR reverse switch to re-reverse the polarity of the one of the tip-ring pairs TR2–TR4 of the lines $24_2$–$24_4$.

In response to detecting the re-reversal of the polarity, the one of the RTC testers $20_1$–$12_3$ adapts itself to convey control signals to the ERM 22 on one of the sleeves S2–S4 of the lines $24_2$–$24_4$ corresponding to the one of the tip-ring pairs TR2–TR4 of lines $24_2$–$24_4$. The control signals on the one of the sleeves S2–S4 of the lines $24_2$–$24_4$ are detected by one of the sleeve current detect/terminations $44_2$–$44_4$ which supplies to the controller 50 signals indicative thereof. In response to the signals from the one of the sleeve current detect/terminations $44_2$–$44_4$, the controller 50 causes the relays 72 and 74 to adjust and connect the one of the tip-ring pairs TR2–TR4 of the lines $24_2$–$24_4$,to the tip-ring pair TRB, thereby creating between the one of the RTC testers $20_1$–$12_3$ and the selected telephone line, a test path which includes the one of the tip-ring pairs TR2–TR4 of the lines $24_2$–$24_4$, the tip-ring TRB and the tip-ring TR Bus.

Figure 5:
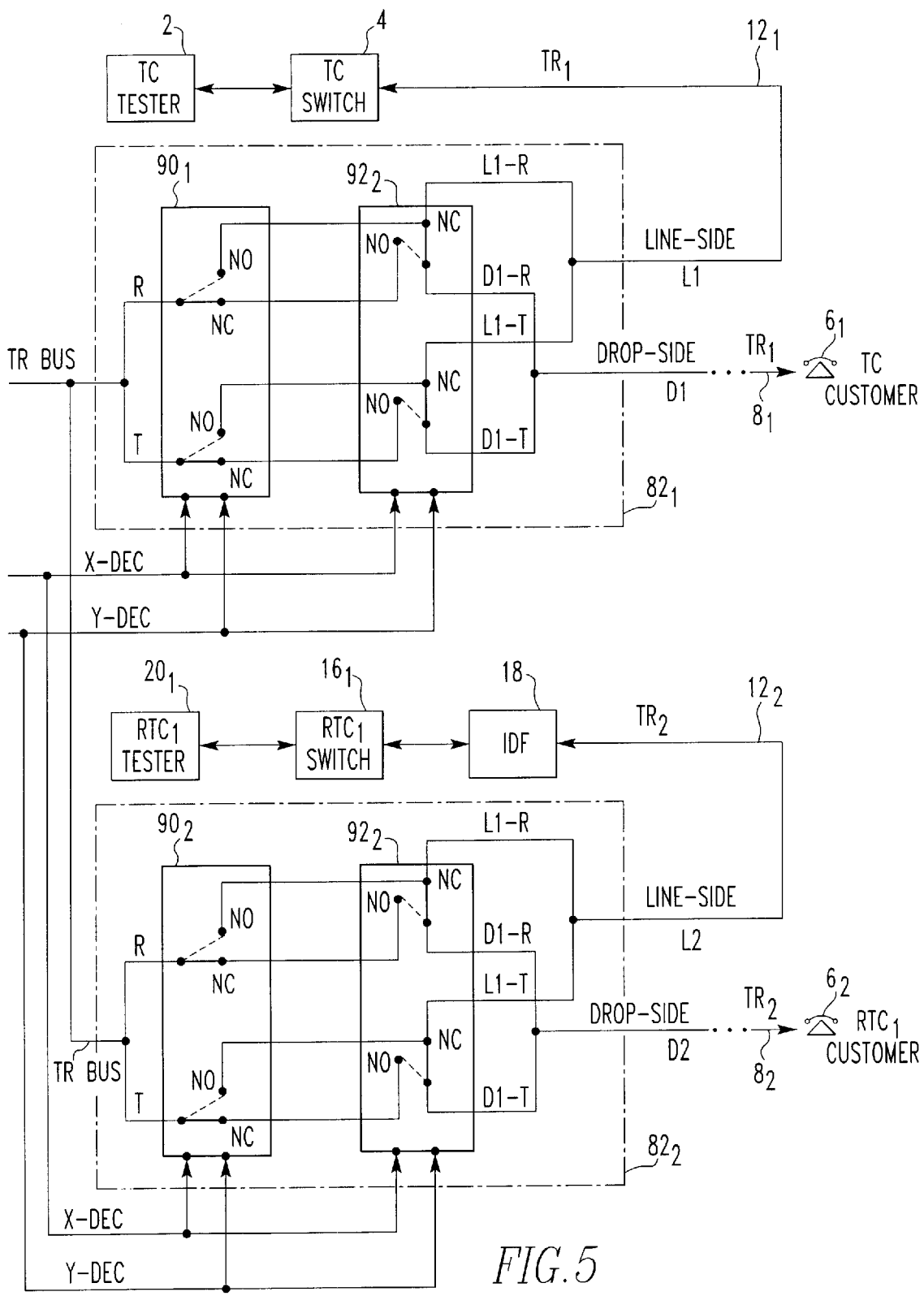
FIG. 5 is a block diagram of two of the relay assemblies of FIG. 4b.

Referring to FIG. 5, and with ongoing reference to FIGS. 3 and 4a–4b, a pair of relay assemblies $82_1$ and $82_2$ are shown isolated from the line matrix 80. The relay assembly $82_1$ includes a first double-pole double-throw relay $90_1$ and a second double-pole double-throw relay $92_1$. The control inputs of the relays $90_1$ and $92_1$ are energizable via the X-DEC signal and the Y-DEC signal supplied from the X-decoder 84 and the Y-decoder 86, respectively. In a relaxed state, when the X-DEC signal and Y-DEC signal are not supplied to the control inputs of the relays $90_1$ and $92_1$, the drop-side 81 of the telephone line of the TC customer $6_1$ is connected to the TC switch 4 through the normally closed contacts of the relay $92_1$ and the line-side $12_1$ of the telephone line of the TC customer $6_1$.

To detect the presence or absence of customer activity on the telephone line of the customer $6_1$, the control inputs of the relay $90_1$ are energized by the X-DEC signal and the Y-DEC signal so that the contacts of the relay $90_1$ are adjusted from the normally closed state to the normally open state. This adjustment connects the tip-ring pair TR Bus to the telephone line of the TC customer $6_1$ in a bridge mode. When the telephone line of the TC customer $6_1$ is connected to the tip-ring pair TR Bus in a bridge mode and the relay 88 is adjusted so that the tip-ring pair TRA are connected to the tip-ring pair TR Bus, the controller 50 causes the DC detect circuit 68 and AC detect circuit 70 to be connected to the tip-ring pair TRA to detect activity on the telephone line of the TC customer $6_1$.

If activity is detected on the telephone line of the TC customer $6_1$, the DC detect circuit 68 and/or the AC detect circuit 70 supply to the controller 50 a signal indicative thereof. In response to the signal indicative of customer activity on the telephone line of the TC customer $6_1$, the controller 50 causes the relay $92_1$ to maintain the connection between the line-side $12_1$ and the drop-side $8_1$ of the telephone line of the TC customer $6_1$. For simplicity of illustration, the line-side 12 and the drop-side 8 of each customer telephone line are illustrated as a single line. However, each customer telephone line includes a tip-ring pair, e.g., $TR_1$, which are connectable to the tip-ring pair TR Bus via the line matrix 80.

If, however, no activity is detected on the telephone line of the TC customer $6_1$, the DC detect circuit 68 and the AC detect circuit 70 do not supply signals to the controller 50. In the absence of receiving signals from the DC detect circuit 68 and the AC detect circuit 70, the controller 50 causes the X-decoder 84 and the Y-decoder 86 to supply the X-DEC signal and Y-DEC signal to the control inputs of relays $90_1$ and $92_1$. These signals cause the contacts of relays $90_1$ and $92_1$, to change state to connect the tip-ring pair TR Bus to the drop-side $8_1$ of the telephone line of the TC customer $6_1$ or the line-side $12_1$ of the telephone line of the TC customer $6_1$.

To connect the drop-side $8_1$ of the telephone line of the TC customer $6_1$ to the tip-ring pair TR Bus, the controller 50 causes the X-decoder 84 and the Y-decoder 86 to supply to the relays $90_1$ and $92_1$ the X-DEC signal and the Y-DEC signal which cause the contacts of the relay $92_1$ to adjust to the normally open state and the contacts of relay $90_1$ to adjust to, or remain in, the normally closed state. When the contacts of relays $90_1$ and $92_1$ are adjusted to these states, the tip-ring pair TR Bus is connected to the drop-side $8_1$ of the telephone line of the TC customer $6_1$.

To connect the line-side $12_1$ of the telephone line of the TC customer $6_1$ to the tip-ring pair TR Bus, the controller 50 causes the X-decoder 84 and the Y-decoder 86 to supply to the relays $90_1$ and $92_1$ the X-DEC signal and the Y-DEC signal which cause the contacts of relays $90_1$ and $92_1$ to adjust to the normally open state. When the contacts of relays $90_1$ and $92_1$ are adjusted to the normally open state, the tip-ring pair TR Bus is connected to the line-side $12_1$ of the telephone line of the TC customer $6_1$.

The relay assembly $82_2$, shown in FIG. 5, operates in the same manner as the relay $82_1$ described above. Specifically, the contacts of relays $90_2$ and $92_2$ of the relay assembly $82_2$ are adjusted in response to the X-DEC signal and the Y-DEC signal supplied to the control inputs of the relays $90_2$ and $92_2$ to connect the tip-ring pair TR Bus to the drop-side $8_2$ and/or the line-side $12_2$ of the telephone line of the $RTC_1$ customer $6_2$.

The relay assemblies $82_1$ and $82_2$ are representative of the relay assemblies $82_3$–$82_{50}$ shown in block diagram form in FIG. 4b. In the embodiment shown in FIG. 5, the telephone line of the TC customer $6_1$ is connected to the TC tester 2 via the TC switch 4 and the relay assembly $82_1$. Moreover, the telephone line of the $RTC_1$ customer $6_2$ is connected to the $RTC_1$ tester $20_1$ via the $RTC_1$ switch $16_1$, the IDF 18 and the relay assembly $82_2$. The TC customer $6_1$, however, can be connected to one of the RTC switches $16_1$–$16_3$ by disconnecting the line-side $12_1$ of the TC customer $6_1$ from the TC switch 4 and connecting the line-side $12_1$ to a port of the IDF 18 which is connected to the one of the RTC switches $16_1$–$16_3$. Similarly, the $RTC_1$ customer $6_2$ can be connected to the TC switch 4, the $RTC_2$ switch $16_2$ or the $RTC_3$ switch $16_3$, by disconnecting the line-side $12_2$ from the port of the IDF 18 which connects the $RTC_1$ customer $6_2$ to the $RTC_1$ switch $16_1$, and connecting the line-side $12_2$ to the TC switch 4 or a port of the IDF 18 which is connected to the $RTC_2$ switch $16_2$ or the $RTC_3$ switch $16_3$. Other customer telephone lines can be connected to the TC switch 4 or one of the RTC switches $16_1$–$16_3$ in a similar manner.

Figure 6:
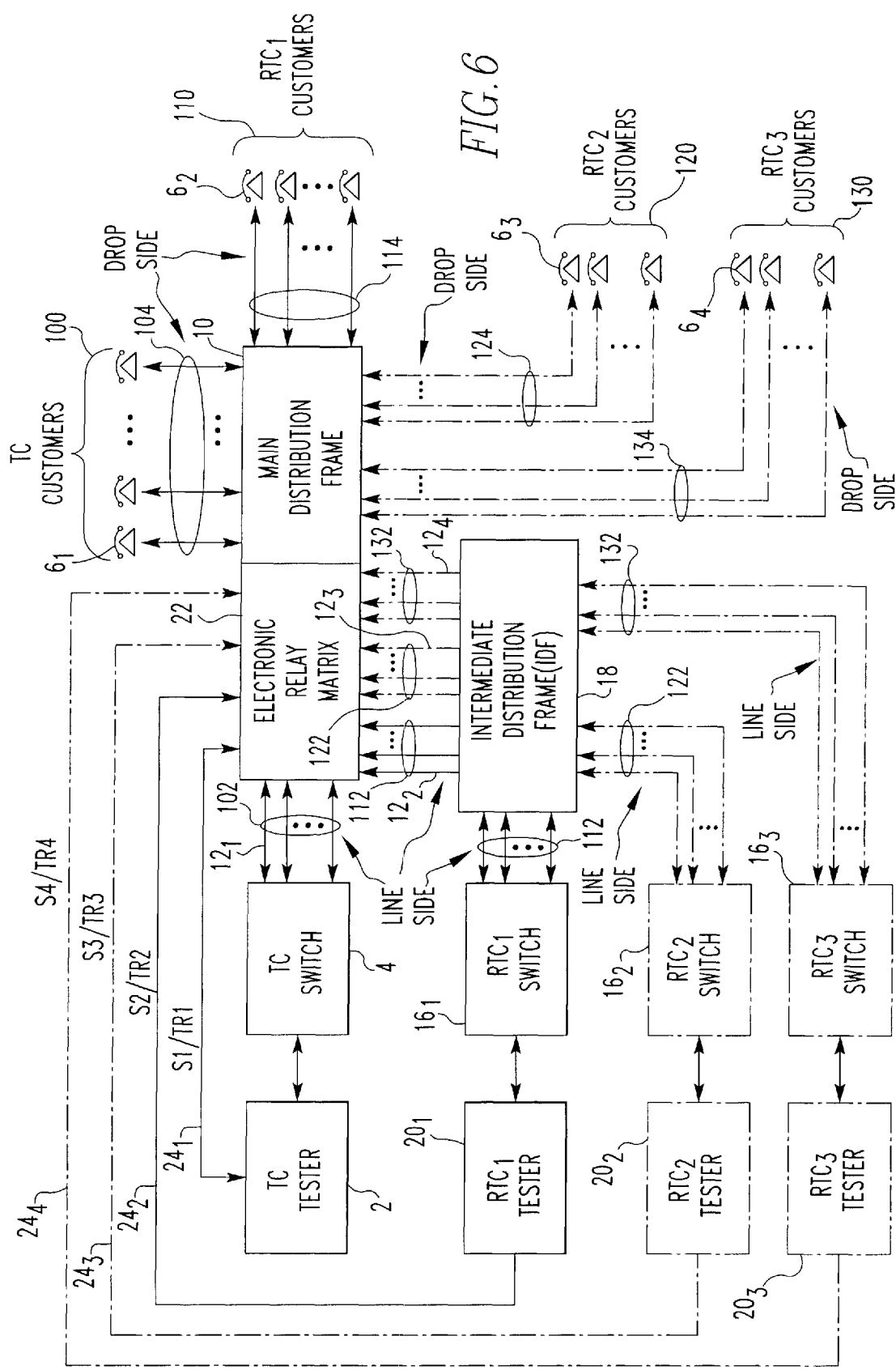
FIG. 6 is a block diagram of the network shown in FIG. 3 including a plurality of customers connected to each of the RTC switches and the TC switch.

In the embodiment shown in FIG. 3, each of the TC switch 4 and the RTC switches $16_1$–$16_3$ are shown servicing one customer $6_1$ and $6_2$–$6_4$, respectively, via the MDF 10 and the ERM 22. However, as shown in FIG. 6, a plurality of TC customers 100 can be connected to the TC switch 4 via the line-sides 102 and the drop-sides 104 of a plurality of telephone lines of the TC customers 100. Similarly, a plurality of $RTC_1$ customers 110 can be connected to the RTC$_1$ switch 16$_1$ via the line-sides 112 and the drop-sides 114 of a plurality of telephone lines of the RTC$_1$ customers 110. Moreover, a plurality of RTC$_2$ customers 120 can be connected to the RTC$_2$ switch 16$_2$ via the line-sides 122 and the drop-sides 124 of a plurality of telephone lines of the RTC$_2$ customers, and a plurality of RTC$_3$ customers 130 can be connected to the RTC$_3$ switch 16$_3$ via the line-sides 132 and the drop-sides 134 of a plurality of telephone lines of the RTC$_3$ customers.

The TC switch 4 enables each of the line-sides 102 connected thereto to be selectively connected to the TC tester 2. For example, in response to a control signal from the TC tester 2, the TC switch 4 connects the TC tester 2 to a selected one of the line-sides 102, e.g., line-side 12$_1$. Each RTC switch 16$_1$–16$_3$ enables each of the line-sides 112, 122 and 132 connected thereto to be selectively connected to one of the RTC testers 20$_1$–20$_3$. For example, in response to a control signal from the RTC tester 20$_1$, the RTC$_1$ switch 16$_1$ connects the RTC$_1$ tester to a selected one of the line-sides 112, e.g., line-side 12$_2$.

When testing is complete, the one of the TC tester 2 and the RTC testers 20$_1$–12$_3$ conducting a test supplies to the ERM 22 via the corresponding sleeve S1–S4 of the lines 24$_1$–24$_4$ a test termination control signal. The sleeve current detect/termination 44$_1$–44$_4$ connected to the sleeve S1–S4 of the lines 24$_1$–24$_4$ on which the test termination control signal is supplied converts this signal into a digital test termination control signal which is supplied to the controller 50. In response to receiving the digital test termination control signal, the controller 50 causes the X-decoder 84 and the-Y-decoder 86 to withhold from the line matrix 80 the X-DEC signal-and the Y-DEC signal. In the absence of the X-DEC signal and the Y-DEC signal, the relay assemblies 82$_1$–82$_{50}$ of the line matrix 80 adjust to their normally closed state thereby connecting together the line-side and the drop-side of each customer telephone line connected to the line matrix 80. The digital test termination control signal also causes the controller 50 to adjust the relays 66 and 74, as necessary, to isolate the tip-ring pair TRA from the tip-ring pair TR1 of line 24$_1$ or to isolate the tip-ring pair TRB from one of the tip-ring pairs TR2–TR4 of lines 24$_2$–24$_4$, respectively.

Based on the foregoing, it can be seen that the ERM 22 enables the TC tester 2 or the RTC testers 20$_1$–12$_3$ to test the drop-side 8 and/or the line-side 12 of any telephone line connected to the respective MDF 10 and/or the ERM 22. For security purposes, the controller 50 can be programmed to provide controlled access to telephone lines connected to the MDF 10 and/or the ERM 22. For example, the controller 50 can be programmed so that the RTC testers 20$_1$–12$_3$ access only the telephone lines of their respective customers. Moreover, the controller 50 can be programmed to restrict access to telephone lines connected to the TC switch 4 or one of the RTC switches 16$_1$–16$_3$.

The ERM 22 can include a plurality of line matrices 80 connected to the tip-ring pair TR Bus and the output of the X-decoder 84 and the Y-decoder 86. The decoding capability of the controller 50, the X-decoder 84 and the Y-decoder 86 determine how many relay assemblies 82 the ERM 22 includes. In a preferred embodiment, the ERM 22 includes four line matrices 80, having fifty relay assemblies each, in a common housing that is connected to the MDF 10.

In the absence of being routed through a line matrix 80, the line-side and drop-side of a customer telephone line are connected together. When a line matrix 80 is installed, however, the line-side and/or drop-side of the customer telephone line are connected to a relay assembly 82 in the manner described above.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A method of testing a telephone line comprising:
   (a) providing an electronic relay matrix (ERM) connected in series between a line-side and a drop-side of a telephone line;
   (b) providing first and second testers connected to the ERM via respective test paths:
   (c) detecting with the ERM the presence or absence of activity on the telephone line when its line-side and drop-side are connected together;
   (d) in response to detecting the an absence of activity on the telephone line the ERM disconnecting the line-side of the telephone line from the drop-side of the telephone line and connecting the test path of the first tester to one of the line-side and the drop-side of the telephone line; and
   (e) testing the one of the line-side and the drop-side of the telephone line with the first tester via its test path.

2. The method of claim 1, wherein step (c) includes
   the ERM detecting a control signal from the first tester; and
   in response to detecting the control signal, bridge connecting the ERM to detect the presence or absence of activity on the telephone line.

3. The method of claim 1, further including:
   disconnecting the test path of the first tester from the one of the line-side and the drop-side of the telephone line; and
   connecting the test path of the second tester in to at least one of the line-side and the drop-side of the telephone line.

4. The method of claim 1, further including connecting the test path of the second tester to the other of the line-side and the drop-side of the telephone line.

* * * * *

UNITED STATES PATENT AND TRADEMARK OFFICE
CERTIFICATE OF CORRECTION

PATENT NO.   : 6,650,732 B2
DATED        : November 18, 2003
INVENTOR(S)  : John M. Benedict et al.

It is certified that error appears in the above-identified patent and that said Letters Patent is hereby corrected as shown below:

Title page,
Item [57], ABSTRACT,
Line 3, "testers (2, $20_{1-203}$)" should read -- testers (2, $20_1$-$20_3$) --.

Column 4,
Line 65, "customer 61" should read -- customer $6_1$ --.

Column 7,
Line 13, "testers $20_1$-$12_3$" should read -- testers $20_1$-$20_3$ --.
Line 40, between "to" and "adjust" delete hyphen (-).

Column 8,
Line 18, between "to" and "the" delete hyphen (-).
Lines 27 and 40, "$20_1$-$12_3$" should read -- $20_1$-$20_3$ --.

Column 9,
Line 9, "$20_1$-$12_3$" should read -- $20_1$-$20_3$ --.
Line 34, "drop-side 81" should read -- drop-side $8_1$ --.

Column 11,
Lines 22, 44 and 50, "$20_1$-$12_3$" should read -- $20_1$-$20_3$ --.

Column 12,
Line 27, paragraph (b), "paths:" should read -- paths; --.
Line 31, paragraph (d), "detecting the an absence" should read
-- detecting an absence --.

Signed and Sealed this

Thirteenth Day of April, 2004

JON W. DUDAS
*Acting Director of the United States Patent and Trademark Office*